United States Patent [19]

Hartmann

[11] Patent Number: 4,702,121
[45] Date of Patent: Oct. 27, 1987

[54] MULTIPLE SPEED DRIVING WHEEL FOR PEDAL POWERED VEHICLES

[76] Inventor: Dirck T. Hartmann, 4121 Morningstar Dr., Huntington Beach, Calif. 92649

[21] Appl. No.: 883,953

[22] Filed: Jul. 10, 1986

[51] Int. Cl.[4] ............................................. F16H 3/08
[52] U.S. Cl. ...................................... 74/375; 74/371; 280/238
[58] Field of Search ...................... 74/750 B, 371, 372, 74/363, 375; 280/236, 238, 260

[56] References Cited

U.S. PATENT DOCUMENTS

| | | | |
|---|---|---|---|
| 609,664 | 8/1898 | Dibble | 280/260 |
| 619,118 | 2/1899 | Barnes | 280/260 |
| 707,359 | 8/1902 | Scharbach | 74/347 |
| 1,184,321 | 5/1916 | Chapin | 280/270 |
| 1,506,565 | 8/1924 | Clatworthy | 280/7.15 |
| 1,564,767 | 12/1925 | Eggart | 74/371 |
| 1,798,384 | 3/1931 | Roberos | 280/260 |
| 1,862,993 | 6/1932 | Wise | 74/372 |
| 2,505,464 | 4/1950 | Debuit | 280/260 |
| 3,728,912 | 4/1973 | Darnell | 280/236 X |
| 3,863,503 | 2/1975 | Loeb et al. | 74/347 |
| 3,920,263 | 11/1975 | Bunoschuh | 280/106 |
| 3,934,481 | 1/1976 | Foster | 74/190.5 |
| 4,447,068 | 5/1984 | Brooks | 280/260 |
| 4,583,427 | 4/1986 | Blattman | 74/750 B X |

FOREIGN PATENT DOCUMENTS

| | | | |
|---|---|---|---|
| 0170361 | 7/1951 | Austria | 280/238 |
| 0484948 | 10/1929 | Fed. Rep. of Germany | 74/371 |
| 1944934 | 3/1971 | Fed. Rep. of Germany | 280/238 |
| 0795941 | 3/1936 | France | 74/371 |
| 0253158 | 11/1948 | Switzerland | 74/363 |

Primary Examiner—Leslie A. Braun
Assistant Examiner—Martin G. Belisario
Attorney, Agent, or Firm—Fulwider, Patton, Rieber, Lee & Utecht

[57] ABSTRACT

A thirteen-speed driving wheel which includes a pedal drive shaft on the axis of the wheel, pedal crank arms, and vehicle interface fittings on both sides for mounting in pedal powered vehicles to replace the chain and derailleur system used in conventional bicycles. The driving wheel is particularly well suited for use in front wheel drive recumbent bicycles and tricycles and, because the driving gears are all enclosed within the wheel hub, provides a compact, low maintenance alternative to conventional chain drives.

7 Claims, 5 Drawing Figures

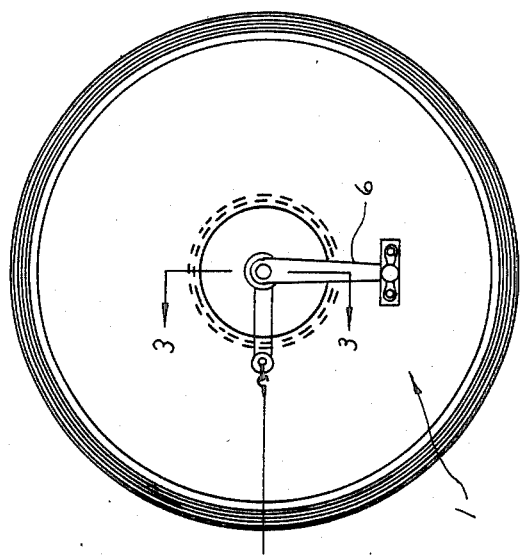
FIG 1
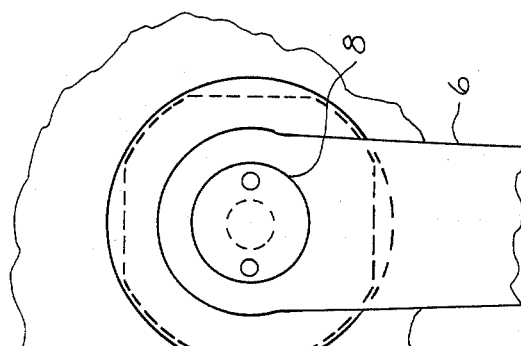
FIG 2
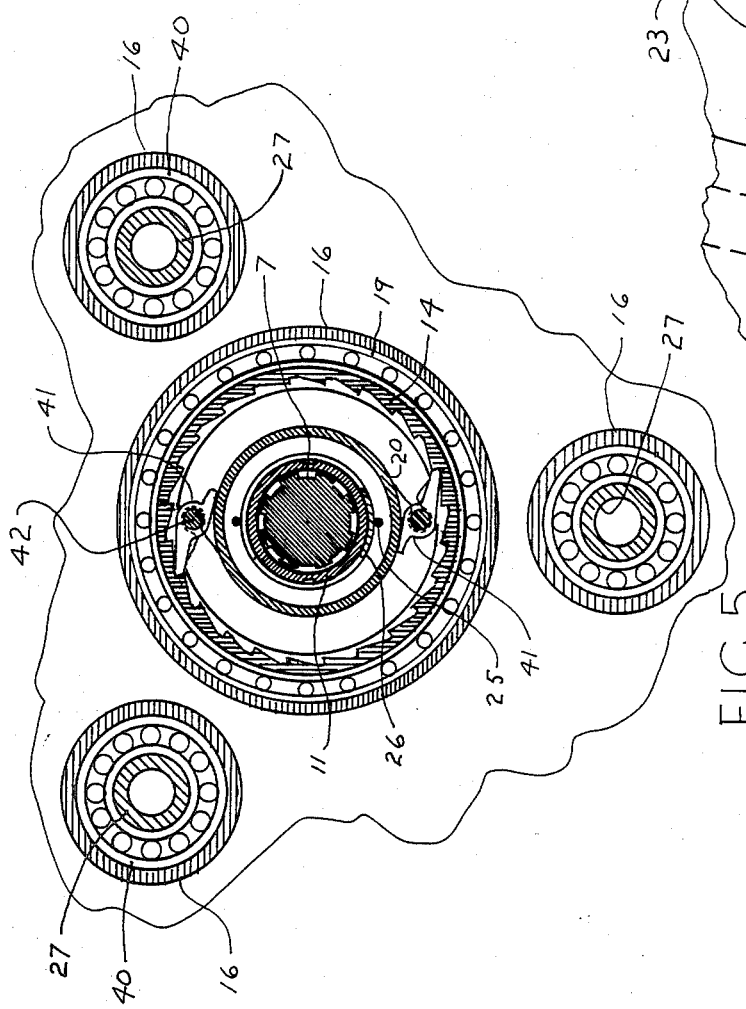
FIG 5
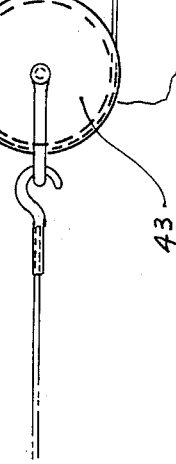

MULTIPLE SPEED DRIVING WHEEL FOR PEDAL POWERED VEHICLES

BACKGROUND OF THE INVENTION

1. Field of the Invention:

This invention relates generally to multiple speed drives for bicycles and tricycles and more particularly to bicycle drive mechanisms of the chainless type.

2. Description of the Prior Art:

The most common multiple speed bicycle uses a chain and derailleur system. The chain requires periodic cleaning and oiling for efficient operation and to prevent premature chain failure, and it must be removed from the rear sprocket to change the rear tire. Also, when the rider is bearing down hard on the pedals on a hill, the derailleur usually will not carry the chain to a lower gear. Consequently, with a chain/derailleur system, the cyclist must anticipate the terrain and shift gears before getting on a hill in a gear that is too high, since he may not then be able to shift to a lower gear. Further, all the gears of a conventional ten-speed are not efficiently useable because of the angle the chain makes with the sprockets. In addition, shifting is not done in a simple set sequence that is easily mastered. These problems are eliminated with the present invention, as will be seen.

The transmission described in U.S. Pat. No. 2,505,464 by Debuit is located on the axis of the wheel concentric with the pedal drive shaft, as in the present invention However, Debuit's transmission carries the pedal torque through single gear teeth requiring large-tooth gears, is mounted alongside the wheel hub rather than inside it, is limited in the number of gear ratios it makes available (four plus a direct drive option), and uses rows of balls and internal pistons for locking gears mounted loose on a hollow shaft to the shaft. This arrangement does not appear practical because centrifugal force is continually pushing the balls outward into engagement with the pinions that are intended to slide freely on the hollow shaft.

SUMMARY OF THE INVENTION

An object of this invention is to provide a compact, low maintenance, thirteen-speed alternative to the chain/derailleur system, which can be used for rear wheel drive bicycles and, more importantly, which can provide an efficient front wheel drive for comfortable, low drag, recumbent tricycles and bicycles.

Briefly, the driving wheel of the present invention includes a pedal drive shaft supported in bearings on the axis of the wheel. A vehicle frame interface fitting on each side of the wheel engages the outer races of the drive shaft support bearings and is prevented from rotating by the vehicle frame. A gear case is splined to the frame interface fitting on one side and three idler shafts are mounted parallel to the pedal drive shaft in bearings in the gear case. A drive gear carrier fitting is mounted on and driven by the pedal drive shaft. Three drive gears rotate freely on the carrier with provisions for selectively locking any one of them to the carrier. Each of the drive gears meshes with a mating gear rigidly fixed to the idler shaft so that the selected drive gear drives all three idler shafts. Four additional gears rigidly fixed on each idler shaft engage four gears freely rotating on a driven gear carrier concentric with the pedal drive shaft with provisions for selectively locking any one of the freely rotating gears to the carrier. The driven gear carrier drives the wheel hub through a conventional free-wheel ratchet mechanism.

The three drive gears and four driven gears provide twelve gear combinations which, with a direct drive option in which the drive gear carrier is coupled directly to the driven gear carrier, make thirteen speeds. The wheel provides speeds two through five with the smallest drive gear locked to the drive gear carrier by sequentially locking the largest to the smallest driven gears to the driven gear carrier; speeds six through nine by repeating the same driven gear locking sequence with the intermediate drive gear locked to the drive gear carrier; and speeds ten through thirteen by again repeating the same driven gear locking sequence with the largest drive gear locked to the drive gear carrier.

BRIEF DESCRIPTION OF THE DRAWINGS

FIG. 1 is a side view of the driving wheel;

FIG. 2 is an enlarged partial side view of the wheel hub;

FIG. 3 is an enlarged cross sectional view taken along the line 3—3 of FIG. 1;

FIG. 4 is a cross sectional view taken along the line 4—4 of FIG. 3; and

FIG. 5 is a cross sectional view taken along the line 5—5 of FIG. 3.

DESCRIPTION OF THE PREFERRED EMBODIMENT

Figures 3, 4:
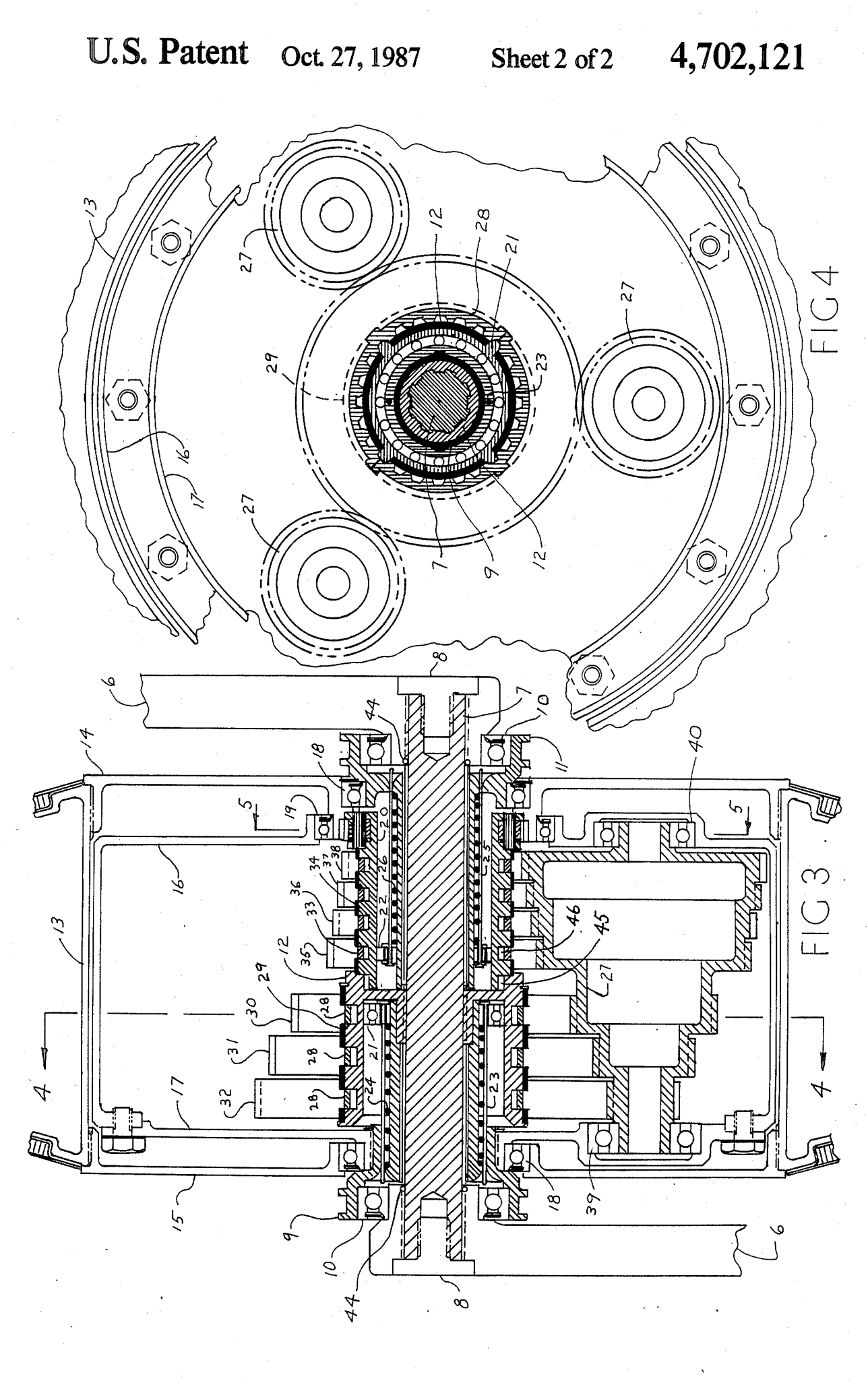

Referring to FIG. 3, the driving wheel in accordance with the present invention includes a pair of pedal crank arms 6, a drive shaft 7, vehicle frame interface fittings 9 and 11, a drive gear carrier 12, a wheel hub 13, a wheel hub driving plate 14, a wheel hub closing plate 15, a gear case 6, and a gear case closing plate 17. A split ring 28 is installed in each of three circumferential grooves in the drive gear carrier 12. Drive gears 30, 31, and 32 are installed over the split rings 28 with projections on the split rings keying them to the gears, as seen in FIG. 4. The drive gears slide freely on porous bronze bushings 29 which maintain the spacing between the gears.

As seen in FIG. 4, four radial projections on a drive gear selector 21 slide in axial slots in the drive gear carrier 12 and key the split ring in the plane of which it is located to the drive gear carrier. The drive gear selector is made up in the form of a ball bearing with the outer race keyed to and rotating with the drive gear carrier, and the inner race keyed to a cylindrical extension on the vehicle frame interface fitting 9. Axial position of the selector 21 is controlled by the drive gear selector return spring 24 and the selector actuation cable 23 which passes out through two holes in the vehicle frame interface fitting 9 and, as seen in FIG. 2, wraps around the pulley 43 with both ends of the cable 23 captive in the inner race of the selector 21.

As seen in FIG. 3, a driven gear carrier 20 is also concentric with the pedal drive shaft 7 and rotates freely between the drive gear carrier 12 and the wheel hub driving plate 14. A split ring 33 is installed in each of four circumferential grooves in the driven gear carrier 20 and the driven gears 35, 36, 37 and 38 are installed over the split rings 33 with projections on the split rings 33 keying them to the gears. Porous bronze bushings 34 are installed between the driven gear carrier 20 and the driven gears 35, 36, 37 and 38 so that the gears rotate freely relative to the carrier 20. Four radial projections on a driven gear selector 22 slide in axial slots in the driven gear carrier 20 and key the split ring 33 in the plane of which the selector 22 is located to the carrier 20. This basic arrangement is nearly identical to that described for locking the drive gears to the drive gear carrier 12, and shown in FIG. 4. Axial position of the driven gear selector 22 is controlled by the actuation cable 25 and the return spring 26, which is identical to the means for controlling the axial position of the drive gear selector 21 described before. The inner race of the driven gear selector 22 is prevented from rotating by a pair of integral projections which slide in axial tracks in the cylindrical extension of the vehicle frame interface fitting 11 shown in FIG. 3.

As shown in FIG. 5, the spring loaded dogs 41 mounted on the steel pins 42 in the driven gear carrier 20 drive the wheel hub driving plate 14 in a conventional free-wheel ratchet arrangement. The wheel hub driving plate 14 is supported on a ball bearing 18 seated on the vehicle frame interface fitting 11. The wheel hub closing plate 15 is supported on an identical bearing 18 seated on the gear case closing plate 17, which is supported on a splined section of the vehicle frame interface fitting 9 so that the gear case closing plate 17 cannot rotate.

As shown in FIGS. 3, 4 and 5, three idler shafts 27, each composed of a cluster of seven gears rigidly joined together, are installed 120 degrees apart with one end of each supported in a ball bearing 39 in the gear case closing plate 17, and the other end supported in a ball bearing 40 in the gear case. The gear case is supported on one end by the gear case closing plate, and on the other end by a ball bearing 19 seated on the wheel hub driving plate 14. All three idler shafts 27 are driven by a selected one of the drive gears 30, 31 or 32 in the plane of which the drive gear selector 21 is located. All three idler shafts drive the driven gear carrier 20 through a selected one of the driven gears 35, 36, 37 or 38 in the plane of which the driven gear selector 22 is located. When the driven gear selector 22 is positioned against the end of the drive gear carrier 12, all four driven gears rotate freely on the carrier 20, and the internal tooth form 45 on the end of the drive gear carrier 12, which matches the tooth form 46 on the split rings 33, engages the four radial projections on the driven gear selector 22 so that pedal torque is transferred directly from the drive gear carrier 12 to the driven gear carrier 20.

As shown in FIGS. 3 and 4, the pedal drive shaft 7 is splined for the transfer of torque from the pedal crank arms 6 to the drive gear carrier 12. Axial position of the crank arms 6 on the splined shaft 7 is maintained by the spanner bolts 8 which hold the crank arms 6 seated against the wire snap rings 44. The crank arms 6 are held centered in the vehicle frame interface fittings 9 and 11 by the ball bearings 10.

In the design example developed to illustrate the present invention, 32 pitch gears are used with 88, 102 and 111 teeth, respectively, for the driving gears 30, 31 and 32. The number of teeth in each gear and resulting gear ratios are given in the table below, together with the vehicle speed for a pedal speed of 80 revolutions per minute and a 27 inch diameter driving wheel. The first number given is the number of teeth in the selected gear on the drive gear carrier 12; the second the number of teeth in the mating gear driving the idler shaft; the third the number of teeth in the gear on the idler shaft driving the selected gear on the driven gear carrier 20; and the fourth the number of teeth in the selected gear on the driven gear carrier 20.

|  |  |  | Gear Ratio | MPH |
|---|---|---|---|---|
| first | direct drive |  | 1.000 | 6.426 |
| second | 88/44 | 66/66 | 2.000 | 12.852 |
| third | 88/44 | 69/63 | 2.190 | 14.073 |
| fourth | 88/44 | 72/60 | 2.400 | 15.422 |
| fifth | 88/44 | 75/57 | 2.631 | 16.907 |
| sixth | 102/30 | 66/66 | 3.400 | 21.848 |
| seventh | 102/30 | 69/63 | 3.724 | 23.920 |
| eighth | 102/30 | 72/60 | 4.080 | 26.218 |
| ninth | 102/30 | 75/57 | 4.474 | 28.748 |
| tenth | 111/21 | 66/66 | 5.286 | 33.966 |
| eleventh | 111/21 | 69/63 | 5.789 | 37.200 |
| twelfth | 111/21 | 72/60 | 6.343 | 40.759 |
| thirteenth | 111/21 | 75/57 | 6.955 | 44.692 |

In the example design for the driving wheel 1 shown in FIGS. 1 and 3, a layup of advanced composite material is used for coupling the wheel hub 13 with the wheel rim 45. This disk wheel design is compatible with low drag, high performance vehicles such as a fully faired, front wheel drive, rear wheel steer recumbent tricycle, for which the high gear ratios shown in the table above appear desirable. Conventional bicycle spokes can be used for joining the hub and rim with lower gear ratios for more conventional pedal powered vehicles, with the same basic configuration.

While this invention has been described in terms of a preferred embodiment, it is realized that persons skilled in the art will, upon reading the written description and studying the drawings, be able to visualize many possible variations and alterations. For example, if four gears were used on the drive gear carrier instead of three, with four gears on the driven gear carrier, a sixteen speed driving wheel would result. While it is likely that these are more speeds than most pedal powered vehicles could utilize, it is possible that some applications might benefit from such a change. The invention should not be considered as limited to the number of speeds, gear ratios, or the 32 pitch gears illustrated.

It is therefore intended that the following appended claims be interpreted as including all such variations, alterations and modifications as fall within the true scope and spirit of the present invention.

I claim:

1. An improved multiple speed driving wheel for a pedal powered vehicle including a frame, said wheel comprising:

a central hub;

a pedal drive shaft on the axis of said hub and mounted in bearings for concentric rotation with said hub;

a vehicle frame interface fitting on each side of said hub;

a pedal crank arm fixed on each end of said pedal drive shaft for rotation outboard of said vehicle interface fitting, and including a cylindrical extension;

a pair of ball bearings having their inner races seated on the cylindrical extensions of said pedal crank arms, respectively, and their outer races seated inside said vehicle frame interface fittings, respectively;

a gear case located within said central hub and fixed to one of said vehicle interface fittings;

a drive gear carrier fixed on said pedal drive shaft for rotation therewith;

multiple drive gears rotatably mounted on said drive gear carrier;

drive gear locking means located outside the circumference of said pedal drive shaft, operative for selectively locking any one of said multiple drive gears to said drive gear carrier;

a driven gear carrier mounted for concentric rotation about said pedal drive shaft;

multiple driven gears rotatably mounted on said driven gear carrier;

driven gear locking means located outside the circumference of said pedal drive shaft, operative for selectively locking any one of said multiple driven gears to said driven gear carrier; multiple idler shafts rotatably mounted in said gear case, positioned parallel to and equally spaced around said pedal drive shaft;

gears fixed on each of said multiple idler shafts in mesh with each of said multiple drive gears and each of said multiple driven gears; and free-wheel ratchet means coupling said driven gear carrier with said hub for driving said wheel.

2. A driving wheel according to claim 1 wherein said vehicle interface fittings include integral inboard extensions, respectively, and including a driving plate rotatably mounted on one of said inboard cylindrical extensions and supporting one end of said hub, and further including a hub closing plate rotatably mounted on the other of said inboard cylindrical extensions and supporting the other end of said hub.

3. A driving wheel according to claim 1 wherein said vehicle interface fittings include integral inboard cylindrical extensions, respectively, and wherein said drive gear locking means comprises a plurality of circumferential grooves formed in said drive gear carrier, a plurality of split rings installed in said circumferential grooves, respectively; said multiple drive gears receiving said multiple split rings; external teeth on said split rings locking said split rings to said drive gears, respectively, for rotation therewith; a drive gear selector having an outer race keyed to said drive gear carrier for rotation therewith, and an inner race keyed to said inboard cylindrical extension of an associated one of said vehicle interface fittings; internal teeth on said split rings keying said split rings to said drive gear selector; internal axial grooves in said drive gear carrier and external axial grooves in said cylindrical extension permitting axial movement of said drive gear selector relative to said split rings for engaging one of said split rings and locking the associated one of said drive gears to said drive gear carrier; and wherein said associated one of said vehicle interface fittings includes a return spring and a first cable means, and said first cable means is operative to control the axial position of said drive gear selector.

4. A driving wheel according to claim 3 wherein said first cable means includes a pair of diametrically opposed axial holes through the associated one of said vehicle interface fittings, each of said axial holes being characterized at its outboard end by a full internal radius; a pair of parallel holes through said vehicle interface fitting immediately outboard of said wheel hub closing plate; said parallel holes being oriented orthogonal to and intersecting said axial holes; a pulley located immediately outboard of said driving wheel; a cable wrapping around 180 degrees of said pulley; said cable passing through both of said parallel holes, wrapping around 90 degrees of each said internal radius and passing through both of said axial holes, with both ends of said cable captive in said inner race of said drive gear selector; and including means carried by said pedal powered vehicle operative for positioning said pulley.

5. A driving wheel according to claim 1 wherein said vehicle interface fittings include integral inboard cylindrical extensions, respectively, and wherein said driven gear locking means comprises a plurality of circumferential grooves formed in said driven gear carrier; a plurality of split rings installed in said circumferential grooves, respectively; multiple driven gears receiving said split rings; external teeth on said split rings locking said split rings to said driven gears, respectively, for rotation therewith; a driven gear selector having an outer race keyed to said driven gear carrier for rotation therewith, and an inner race keyed to the inboard cylindrical extension of an associated one of said vehicle interface fittings; internal teeth on said split rings keying said split rings to said driven gear selector; internal axial grooves on said driven gear carrier and external axial grooves in said inboard cylindrical extension said vehicle interfacing fitting permitting axial movement of said driven gear to said split rings for engaging one of said split rings and locking the associated one of said driven gears to said driven gear carrier; and wherein said associated one of said vehicle interface fittings includes a return spring and a second cable means, and said second cable means is operative to control the axial position of said driven gear selector.

6. A driving wheel according to claim 5 wherein said second cable means includes a pair of diametrically opposed axial holes through the associated one of said vehicle interface fittings, each of said axial holes being characterized at its outboard end by a full internal radius; a pair of parallel holes through said vehicle interface fitting immediately outboard of said wheel hub driving plate; said pair of parallel holes being oriented orthogonal to and intersecting said axial holes; a pulley located immediately outboard of said driving wheel; a cable wrapping around 180 degrees of said pulley; said cable passing through both of said parallel holes, wrapping around 90 degrees of each said internal radius and passing through both of said axial holes, with both ends of said cable captive in said inner race of said driven gear selector; and including a means carried by said pedal powered vehicle operative for positioning said pulley.

7. A driving wheel according to claim 5 wherein a direct drive from said drive gear carrier includes a short cylindrical extension on the inboard end of said drive gear carrier said cylindrical extension having an inside diameter and internal tooth form matching the inside diameter and tooth form of said split rings installed in said circumferential grooves in said driven gear carrier; said internal axial grooves in said driven gear carrier and said external axial grooves in said cylindrical extension of said vehicle interface fitting permitting axial movement of said driven gear selector into engagement with said internal teeth on said cylindrical extension of said drive gear carrier and providing direct transfer of torque from said drive gear carrier to said driven gear carrier.

* * * * *